Jan. 15, 1957  H. BARCLAY  2,777,330
BELT SUPPORTING DEVICE
Filed Oct. 24, 1952

HERBERT BARCLAY,
INVENTOR.

BY John H. G. Wallace
AGENT

United States Patent Office
2,777,330
Patented Jan. 15, 1957

2,777,330
BELT SUPPORTING DEVICE

Herbert Barclay, Los Angeles, Calif., assignor to The Garrett Corporation, Los Angeles, Calif., a corporation of California Application October 24, 1952, Serial No. 316,759

6 Claims. (Cl. 74—230.7)

This invention relates to a rotary belt supporting device. More particularly, it relates to a belt driving pulley and to a means for providing a replaceable means for providing a belt-centering crown on said pulley.

Heretofore, driving and belt supporting pulleys of various types have been provided with resilient belt engaging surfaces to produce a frictional engagement between the pulley and a belt. These surfaces have been provided with a center crown, i. e., the end diameters were less than the intermediate diameter, to thus maintain the belt on the pulley and to keep such belt under the control thereof and aligned therewith. When using this type of pulley, the crown thereon is subject to wear, thus reducing or eliminating the effectiveness thereof and necessitating the repair and/or replacement of the entire pulley.

The erosion of pulley surfaces greatly increases when abrasive coated belts and the like are used, thus necessitating frequent replacement thereof. It was sometimes possible to form a new crown on a worn pulley, such work being time consuming and expensive, the amount of such re-forming being obviously limited by the available material in the pulley, etc.

It is therefore an object of the present invention to provide a novel belt supporting pulley structure having a replaceable crown producing means.

It is another object of the invention to provide a replaceable means for providing a crown on a belt engaging pulley that is effective, reliable, economical in use, easily replaced and simple in construction.

It is a further object of the invention to provide a novel means for establishing a new and subsequently replaceable crown for a belt engaging pulley.

It is still a further object of the invention to provide a novel crown establishing means for a belt engaging pulley wherein the crown is maintained by means of one or more replaceable resilient toroidal rings positioned in annular grooves in the belt engaging surfaces of said pulley.

Other and further important objects of the invention will become apparent from the disclosures in the following specification, appended claims and accompanying drawing wherein:

Figure 1:
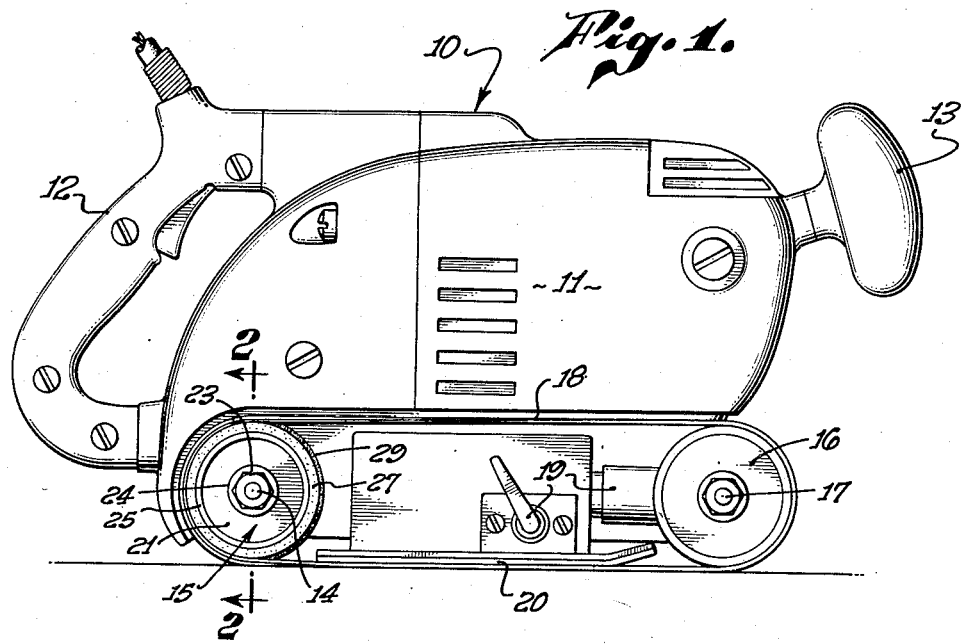
Fig. 1 is a side elevational view of a portable belt sanding apparatus employing the belt engaging pulley of the present invention.

Referring to the drawing, the pulley of the present invention is shown as applied to and in use with a portable belt sanding apparatus generally indicated at 10. It is to be understood, however, that the invention as embodied in this pulley structure, has numerous other applications, that the showing in connection with the sanding apparatus is merely illustrative of one such application, and that the invention is of general utility in the fields of belt transmissions, conveyors and the like, and it is therefore not to be construed as being limited to any one specific use.

As shown, the illustrated sanding apparatus 10 includes a motor-enclosing body 11 having suitable handles 12 and 13. In the customary manner, the motor (not shown) contained in the body 11 is suitably arranged and adapted to drive a shaft 14, a pulley 15 of the present invention being removably secured to the shaft. An idler pulley 16 is rotatably arranged on a shaft 17, the pulleys 15 and 16 being adapted to guide, support and drive an abrasive coated belt 18. The usual means 19 is provided to maintain the proper tension on the belt 18, and a shoe 20 is positioned to engage the inner surface of the lower run of the belt to provide a backing therefor when the sander is in use.

The pulley 15 comprises a body portion 21 having an axial bore 22 for the reception of the shaft 14. The shaft 14 is secured to the pulley 15 by means of a nut 23, engaging pulley hubs 24, at opposite ends of the bore 22, the hubs providing shoulders for positioning of the pulley on the shaft 14. The body portion 21 is also provided with an axially extending annular rim 25 which has a cylindrical outer surface 26.

Figure 2:
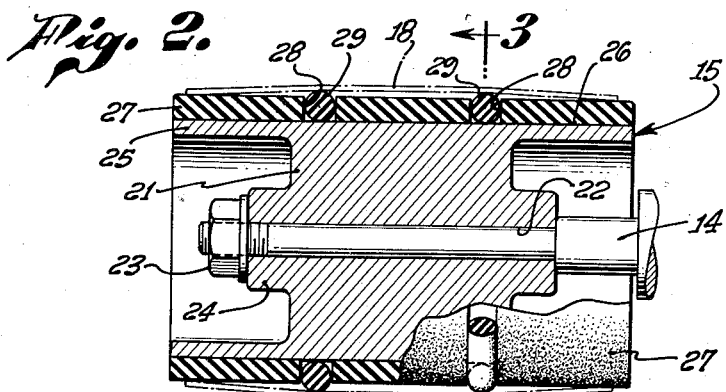
Fig. 2 is a transverse sectional view of the driving pulley, taken substantially as indicated by line 2—2, Fig. 1.
Figure 2A:
Fig. 2A is a similar view of a portion of a modified form of driving pulley.
Figure 3:
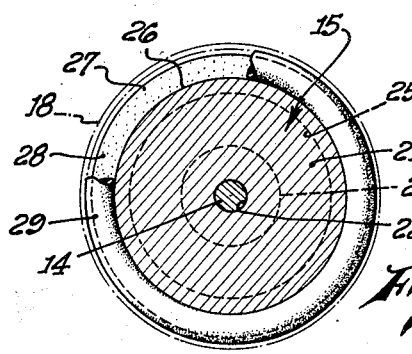
Fig. 3 is a transverse sectional view through the pulley and the crown producing means, taken substantially as indicated by line 3—3, Fig. 2.

A resilient sleeve means 27 is molded to or otherwise secured to the outer cylindrical surface 26 of the rim. This sleeve means may be made from rubber, "neoprene," or other like resilient material in order to provide a frictional belt engaging surface. In the exemplification of Fig. 2, the sleeve means 27 provides annular grooves 28, these grooves being approximately equally spaced from the ends of the sleeve, and from each other, each being rectangular in cross-section, and having a radial depth which is less than the axial length thereof. As shown in Fig. 2, the grooves 28 extend radially through the depth of the sleeve 27, thus dividing the sleeve into three segments. It is to be understood, however, that, as illustrated in Fig. 2A, should the sleeve means be made radially thicker as sleeve means 27A, it will only be necessary for the grooves 28A to be formed in the outer periphery thereof in such a manner as to maintain the before-mentioned cross-sectional configuration.

In order to provide the replaceable means for producing and maintaining a crown on the pulley, a pair of resilient toroidal rings 29 are positioned in the grooves 28, the outer peripheries thereof extending beyond the outer periphery of the sleeve 27. The rings 29 may also be made from rubber, "neoprene" or other suitable resilient material or in some instances, split metallic rings may be employed. Conveniently, the well known elastomeric O-ring seals may be employed for the purpose. While the rings are illustrated as being toroidal, it should be understood that annuli having generating cross-sections other than circular may be utilized.

Thus, as illustrated in Fig. 2, the belt 18 will engage the sleeve 27 adjacent each end thereof, the central area of the belt being adapted to engage the crown formed by the rings 29.

It has been found that due to the open spaces provided between the belt 18, and the pulley, and intermediate the rings 29, fewer metallic chips and less abrasive dust will collect and subsequently build up between the belt and the pulley, thus reducing the erosive effect of such foreign matter to permit longer operation of the apparatus before a new crown will be necessary. Inasmuch as the rings 29 are resilient or otherwise expandable, it is only necessary to provide a new crown for the pulley, that worn rings be removed and new ones be substituted therefor, an operation which may be performed in a few moments without the benefit of special tools, in addition to be being relatively inexpensive.

In some applications, the resilient sleeve 27 may be eliminated and the grooves 28 may be formed directly in the body of the pulley, this type of construction being especially applicable when the pulley is made from "Micarta," fiber, or other such material. In other applications, such as those requiring a narrow pulley, it will be understood that a single ring, arranged in a groove in the center of the belt-engaging surface, may be used to provide the replaceable means for producing a crown.

Having thus described this belt supporting device, and the present embodiments thereof, it is desired to emphasize and again point out the fact that many modifications may be resorted to in a manner limited only by a just interpretation of the following claims.

I claim:

1. A belt driving pulley comprising, in combination: an elongate cylindrical body portion having a cylindrical rim; a resilient sleeve co-extensive with and secured to the outer surface of said rim; a plurality of permanent, preformed spaced annular grooves in said sleeve; and resilient toroidal belt engaging rings removably positioned in said grooves, the outer periphery of said rings being concentric with and spaced radially outwardly from the outer periphery of said sleeve, said rings providing a belt engaging crown for said pulley.

2. A belt driving pulley comprising, in combination: an elongate cylindrical body portion having axially extending hubs and a rim; a resilient sleeve co-extensive with and secured to the outer surface of said rim; a plurality of preformed spaced annular grooves in said sleeve, said grooves having an axial width greater than the radial depth thereof; and resilient toroidal rings removably positioned in said grooves, the outer periphery of said rings being concentric with and spaced radially outwardly from the outer periphery of said sleeve, said rings providing a belt engaging crown for said pulley.

3. A belt driving pulley comprising, in combination: an elongate cylindrical body portion having axially extending hubs and a rim; a resilient sleeve co-extensive with and secured to the outer surface of said rim; a plurality of permanent, preformed annular grooves in said sleeve, said grooves being spaced from each other and from the ends of said sleeve and having an axial width greater than the radial depth thereof; and resilient toroidal belt engaging rings removably positioned in said grooves, the outer peripheries of said rings being concentric with and spaced radially outwardly from the outer periphery of said sleeve, said rings providing a belt engaging crown for said pulley.

4. A belt driving pulley comprising, in combination: an elongate cylindrical body portion having axially extending hubs and a rim; a resilient sleeve co-extensive with and secured to the outer surface of said rim; a pair of permanent, preformed annular grooves in said sleeve, said grooves being spaced from each other and from the ends of said sleeve and having an axial width greater than the radial depth thereof; and resilient toroidal belt engaging rings removably positioned in said grooves, the outer periphery of said rings being concentric with and spaced radially outwardly from the outer periphery of said sleeve, said outer peripheries of said rings providing belt-engaging crown means for said pulley.

5. In a transmission device of the type having a belt: a pulley having an elongated cylindrical body with a cylindrical rim; resilient sleeve means coextensive with and secured to the outer surface of said rim; a plurality of permanent preformed spaced annular grooves provided by said sleeve means; and resilient toroidal belt engaging rings removably positioned in said grooves, the outer peripheries of said rings being concentric with and spaced radially outwardly from the outer periphery of said sleeve means, said outer peripheries of said rings being adapted for engagement by the belt and providing a crown for said pulley.

6. A belt supporting device comprising: a body portion providing a substantially cylindrical rim; resilient sleeve means disposed on said rim to provide a belt-engaging outer surface with spaced grooves; and a resilient ring removably disposed in each groove, said rings having circular cross sections, the diameters of which are greater than the depths of said grooves, the peripheries of said rings projecting beyond the outer surface of said sleeve means to provide said belt-engaging surface with a crown effect.

References Cited in the file of this patent

UNITED STATES PATENTS

| | | |
|---|---|---|
| 916,037 | Scott | Mar. 23, 1909 |
| 1,034,491 | Nelson | Aug. 6, 1912 |
| 1,560,524 | Avery | Nov. 10, 1925 |
| 2,283,497 | Fields et al. | May 19, 1942 |
| 2,437,586 | Aber | Mar. 9, 1948 |

FOREIGN PATENTS

| | | |
|---|---|---|
| 653,387 | France | Nov. 8, 1928 |